United States Patent
Korst et al.

(10) Patent No.: US 9,843,829 B2
(45) Date of Patent: Dec. 12, 2017

(54) METHOD AND SYSTEM FOR EFFICIENTLY COMPILING MEDIA CONTENT ITEMS FOR A MEDIA-ON-DEMAND PLATFORM

(71) Applicant: Funke Digital TV Guide GmbH, Berlin (DE)

(72) Inventors: Jan Korst, Eindhoven (NL); Mauro Barbieri, Eindhoven (NL); Serverius Petrus Paulus Pronk, Vught (NL); Ramon Antoine Wiro Clout, Eindhoven (NL); Paul Schenk, Vienna (AT)

(73) Assignee: FUNKE DIGITAL TV GUIDE GMBH, Berlin (DE)

( * ) Notice: Subject to any disclaimer, the term of this patent is extended or adjusted under 35 U.S.C. 154(b) by 0 days.

(21) Appl. No.: 14/437,604

(22) PCT Filed: Oct. 25, 2013

(86) PCT No.: PCT/EP2013/072457
§ 371 (c)(1),
(2) Date: Apr. 22, 2015

(87) PCT Pub. No.: WO2014/064281
PCT Pub. Date: May 1, 2014

(65) Prior Publication Data
US 2015/0296234 A1 Oct. 15, 2015

(30) Foreign Application Priority Data
Oct. 25, 2012 (EP) .................................... 12189860

(51) Int. Cl.
*H04N 21/25* (2011.01)
*H04N 21/231* (2011.01)
(Continued)

(52) U.S. Cl.
CPC ....... *H04N 21/251* (2013.01); *G06Q 30/0282* (2013.01); *G06Q 30/0645* (2013.01);
(Continued)

(58) Field of Classification Search
CPC ........... G06Q 30/0282; G06Q 30/0645; H04N 21/23113; H04N 21/251; H04N 21/25891;
(Continued)

(56) References Cited

U.S. PATENT DOCUMENTS 8,052,518 B1 * 11/2011 Kelly ...................... A63F 3/081
463/16
8,298,087 B1 * 10/2012 Smith ................ G06Q 30/0255
463/42
(Continued)

FOREIGN PATENT DOCUMENTS

| CN | 1611074 A | 4/2005 |
|---|---|---|
| CN | 101127883 A | 2/2008 |

(Continued)

*Primary Examiner* — Benjamin R Bruckart
*Assistant Examiner* — Jen-Shi Huang
(74) *Attorney, Agent, or Firm* — Ware, Fressola, Maguire & Barber LLP (57) ABSTRACT

For the negotiation of an operator of a media-on-demand platform with its content providers a method and system for efficiently compiling media content items for the media-on-demand platform is provided. The method makes use of a combination of a recommender system to select a suitable set of media content items to be offered for a next period of service and a number-of-rentals predictor for estimating how many videos individual users will rent the following period of service. Furthermore, the method and system can be executed for estimating profit or loss from rentals over the following period of service as well as estimate customer satisfaction.

17 Claims, 1 Drawing Sheet

(51) Int. Cl.
*H04N 21/258* (2011.01)
*H04N 21/472* (2011.01)
*H04N 21/482* (2011.01)
*G06Q 30/02* (2012.01)
*G06Q 30/06* (2012.01)

(52) U.S. Cl.
CPC . *H04N 21/23113* (2013.01); *H04N 21/25891* (2013.01); *H04N 21/47202* (2013.01); *H04N 21/4826* (2013.01)

(58) Field of Classification Search
CPC ......... H04N 21/47202; H04N 21/4826; H04N 21/4532
See application file for complete search history.

(56) References Cited

U.S. PATENT DOCUMENTS

| | | |
|---|---|---|
| 2004/0243479 A1 | 12/2004 | Gross |
| 2006/0026031 A1* | 2/2006 | Gentling ................ G06Q 10/02 705/26.1 |
| 2007/0130585 A1 | 6/2007 | Perret et al. |
| 2008/0010173 A1* | 1/2008 | Rendich ................ G06Q 10/02 705/28 |
| 2012/0158461 A1 | 6/2012 | Aldrey et al. |

FOREIGN PATENT DOCUMENTS

| | | |
|---|---|---|
| RU | 2 451 986 C2 | 5/2012 |
| WO | 2007/103156 A2 | 9/2007 |

\* cited by examiner

METHOD AND SYSTEM FOR EFFICIENTLY COMPILING MEDIA CONTENT ITEMS FOR A MEDIA-ON-DEMAND PLATFORM

CROSS REFERENCE TO RELATED APPLICATIONS

This application is the U.S. National Stage of International Application Number PCT/EP2013/072457 filed on Oct. 25, 2013 which application claims priority under 35 USC §119 to European Patent Application No. 12189860.5 filed on Oct. 25, 2012. Both applications are hereby incorporated by reference in their entirety.

TECHNICAL FIELD

The invention relates to a method and system for efficiently compiling media content items for a media-on-demand platform for being rent by users of the media-on-demand platform and considers the following setting.

BACKGROUND OF THE INVENTION

A media-on-demand operator (e.g. cable-TV or telecom operator) offers on-demand media content items to a group of end-users, wherein the end-users can request to rent media content items from a given set of currently offered media content items any time they want, e.g. via a website, telephone or suitable TV channel.

The media content items can be physical objects like DVDs to be sent to the end-users by postal mail or of digital nature like audio-video files to be streamed from media-on-demand servers to the end-users via a data network. Users may either pay per media content item they rented (pay per rental) or they may have a subscription to rent as many media content items as they want from the set of currently offered media content items (unlimited flatrate). In alternative payment models the end-user can pay a basic e.g. monthly fee and an extra fee per media content item rented (subscription rate). In this alternative payment model the monthly fee may cover a predetermined amount or value of media content items the end-user may rent without being charged an additional fee (limited flatrate).

Typically, the set of currently offered media content items, called "item set" for short, is fixed for a given time period, in the following called "period of service". The period of service may for example be a week or a month. The operator may also offer its services as an internet service, not restricted to a given cable, telecom or logistic network.

To efficiently cater the users of the media-on-demand platform, the operator must repeatedly determine which media content items he wants to offer to the users for the following period of service. The determined media content items the operator has to rent from one or more content providers. A content provider (p) typically offers different item sets (S(p)) of media content items to the operator, called S1(p), S2(p), . . . , Sn(p). The operator chooses from each content provider zero or more item sets to be offered to its end-users for the following period. To be able to offer media content items, the operator negotiates with one or more content providers.

There can be different financial arrangements between convent provider and the operator. For example, the operator can pay a fixed price for making available a given item set, wherein the price may depend on the number of media content items in the item set, their popularity, their quality, and their year of production. Furthermore, the number of subscribers (i.e., end users) that the operator is serving may influence this fixed price. Alternatively, there can be a pay per rent model, where the operator has to pay a certain amount of money to the content provider each time that a media content item is being rented by an end-user. This amount may be identical for all media content items of an item set, but may also depend on the media content item (e.g. it may be higher if it is a recently released feature movie). Yet another possibility is that the financial arrangement consists of a payment of a fixed price and a supplementary fee for each time a media content item is being rented by an end-user.

Likewise, the financial arrangement between operator and end-user may concern a fixed subscription fee, irrespective of the number of media content items that the end-user will rent in the following period, or it may be a pay-per-rent payment, where the payment may depend on the respective media content item. The latter case, where the amount of payment depends on the media content item, is called the differential pay-per-rent model. Alternatively, the end-user pays a subscription fee for a predetermined time period and additionally he has to pay an extra fee for each media content item he or she rents.

In choosing which item set to select, the operator has to take the following issues into account. To satisfy the end-users of the media-on-demand platform, the aim is to offer a broad item set of media content items, in a variety to cover the various interests of each end-user and in a quantity for each end-user to find a sufficient amount of media content items that he or she wants to rent. If the number of offered videos and their quality is not sufficiently appreciated by the end-users, the end-users are likely to rent fewer videos and will consider ending their subscription, leading to decreasing incomes. In a pay-per-rent end-user subscription model, the available media content items should generate interest such that enough income is generated to pay the content providers and generate a reasonable profit. In a fixed-subscription-fee model, the end-users should be satisfied with the offered item set, such that they will renew their subscription and such that other end-users are likely to join.

On the other hand, to avoid making a loss, the operator should balance the broadness of the item set of offered media content items with the estimated profit these media content items will generate. Therefore, the operator should avoid that only the highly popular media content items are offered to satisfy the group of end-users in order to control the expenses for providing an item set to the end-user. It is a fact that at a certain amount of highly popular media content provided to the end-users of the media-on-demand platform each additionally provided highly popular media content item would generate less additional income than its additional costs. It is therefore an object of the operator of the media-on-demand platform to balance the item set carefully. Accordingly, it is an object of the present invention to provide a method for compiling media content items for a media-on-demand platform that supports the operator of the media-on-demand platform maximizing his profit.

Furthermore, recommender systems have been used in various application fields to recommend items (consumer products, TV programs, songs, etc.) or services to alleviate the choice-problem of end-users that are confronted with an excessively large collection of items to choose from. It is an object of such recommender systems to generate personalized recommendations for items that individual end-users are assumed to like. For reaching this target, recommender systems need to be fed with information about the respective end-user. This information can comprise general information about the end-user, such as age, gender, hobbies and general interests as well as information about his or her consumer behaviour and given opinion about certain items and services. Gathering this information can be done implicitly by tracking and recording the consumer habits of the end-users and generating a buying or renting history of the individual end-user. Furthermore, the end-users have to be encouraged to provide ratings explicitly for recently consumed items and services, such that the system can learn the preferences of individual end-users better. From this information the recommender engine can derive items and services that the individual end-user may like. Furthermore, recommender systems can use statistics and personal information about a user for comparing them with data of other users and recommend items these users like or prefer.

It is an object of the invention to provide a method for efficiently compiling media content items for a media-on-demand platform that can be executed automatically by means of a machine such as a computer or the like. One aspect of the present invention to use the information provided by recommender systems on how much each individual end-user is estimated to like each individual regarded media content item that is considered to be added to an item set of media content items to be rent to the group of individual end-users to determine which item set should be offered in the following period of service by the media-on-demand operator. Beyond that, the present invention provides a combination of the information generated by a recommender system with a number-of-rentals predictor that predicts for individual end-users the number of times that they will rent a media content item of a potential media item set in the following period of service. Hence, the method of the present invention helps the operator of a media-on-demand platform to compile a balanced item set of media content items to be offered to end-users for rent or sale, wherein the item set is selected for maximising profit as well as satisfying the end-users.

The above discussed object of the present invention is achieved by an automatic method according to independent claim 1 and a system according to independent claim 15. Within the scope of the invention "automatic" means that the method can be executed by the system completely or partly without the need of an operator to interact. In the following it shall be understood that all organizational steps concerning media content items refer to the meta data of the media content item and not the media content item itself.

According to the present invention an automatic method for automatically and efficiently compiling media content items for a media-on-demand platform is provided. The method comprises the steps of providing a media-on-demand platform for offering media content items for rent to a user or a plurality of users of the media-on-demand platform and providing a regarded media group of regarded media content items comprising at least one regarded media content item. The regarded media content items are considered for being offered to the users on the media-on-demand platform for being rented by the users. It is an object of the inventive method to automatically determine and select suitable media content items from the regarded media group and to automatically provide the selected media content items to the media-on-demand platform for being rented by the users.

The problem to be solved is a technical one in that, from a broad collection of media content items, a subselection has to be made. To this end, a cost function is defined that takes into account the preferences of individual users. The technical aspect lies in obtaining a more efficient utilization of storage space. For example, instead of providing mainly block busters and generally popular videos, the storage space is optimized to provide a more balanced set of videos for rent.

In a step, a recommender system automatically generates a rated group of rated media content items by determining a user specific like-rating for each media content item of the regarded media group. The determined like-rating is generated with regard to an assessment and/or estimation based upon a rental history of the user and/or another representative user of the media-on-demand platform. In the assessment e.g. the media content items the user rented can be categorized by features such as genre, actors, date of release, content or the like, provided with approximated like-ratings and matched with similar regarded media content items. The matched regarded media content items are automatically assigned the same like-rating. Another possibility is that a user provides his personal like-ratings for media content items manually. Basically, the recommender system according to the invention is configured to work according to the principles of operation of known recommender systems.

In a successive step, a number-of-rentals predictor automatically estimates the user specific number of media content items the respective user of the media-on-demand platform would rent from the rated group of rated media content items within a defined period of time. Thereby, the number-of-rentals predictor is considering information about the rental history of the user and/or other representative users of the media-on-demand platform and the respective like-rating of the rated media content items.

It is preferred that the regarded media content items which have a user specific like-rating below a preset value are removed from the rated group of rated media content items by the recommender system. By this means only media content items that are liked by a specific end-user are considered for being added to the media-on-demand platform with respect to this specific end-user only. Of course, the respective media content items may be considered for other end-users of the media-on-demand platform who like the specific regarded media content item.

Preferably, the regarded media content items the user has already rented are identified and removed from the group of regarded media content items by the recommender system. It is not likely that an end-user rents the same media content item twice within a relatively short time period. Therefore, such regarded media content items shall not be considered for being added to the media item set with respect to the respective end-user. Of course, the respective media content items may be considered for other end-users of the media-on-demand platform who have not yet rented the regarded media content item.

Advantageously, the considered information about the rental history of the user comprises information about genre, persons involved in the production of the particular media content item, such as actors, artists, authors, musicians, or directors, date of media release and/or a rental price of the media content item. Thus, it can be analyzed what kind of media content item the individual end-user prefers and if the individual end-user has a fondness for media content items of a certain price class.

Preferably, a user specific ranking of the regarded media content items is generated by the recommender unit according to the respective user specific like-rating of the regarded media content items. By these means the regarded media content items are sorted by the user specific like-ratings for an easy identification of media content items the individual end-user likes more (or less) than other media content items.

It is preferred that regarded media content items with the worst user specific like-rating are removed from the group of regarded media content items by the recommender system.

Preferably, the specific media content items the user will prospectively rent from the group of regarded media content items is determined by the number-of-rentals predictor, based on the user specific number of media content items the user will rent from the group of regarded media content items and the user specific like-rating of the regarded media content items. If the number of media content items the end-user is likely to rent is "n", the 1 to n media content items with the best like-rating are most likely to be rented by the respective end-user.

An alternative prediction model is also possible where in the composition of the list of most-likely rented videos for the end-user one takes into account the similarity between media content items. If two media content items are very similar, it is less likely that the end-user will rent both items within a short period of time. To determine the probability that an end-user will rent similar items in a single rental period one could also take into account information from the end-users rental history.

According to the invention the costs for renting the determined specific media content items from a respective content provider are preferably determined by a financial evaluator unit.

Further preferred, the turnover for renting the determined specific media content items to the user is determined by the data processing unit.

Preferably, the difference between the determined costs and determined turnover is calculated and the expected profit or loss is determined by the data processing unit. Based on this information the method according to the invention can ascertain if a set of regarded media content items is expected to generate profit or loss. By comparing the expected profits or losses of different sets of regarded media content items, the method can comprise e.g. to automatically pick the set of regarded media content items which generates the biggest profit.

It is preferred that the method is executed for a plurality of different users. The determined information, such as like-ratings, amount of media content items the users are likely to rent and amount of specific media content items the users are likely to rent, can be used for generating average values over all end-users considered. Thus, the operator is provided with information about the estimated consumer behavior of a group of end-user with respect to a given item set of media content items.

Preferably, the determined specific media content items the plurality of users will probably rent are added to the media-on-demand platform automatically by the recommender system.

Advantageously, the expected profit or loss is compared with a preset profit value or loss value. Thus, the operator of the media-on-demand platform can see if a prospective item set fulfils given requirements or needs to be adjusted in order to reach a set goal. Furthermore, such adjustment can be performed by the system executing the method according to the invention automatically.

It is preferred that the determined specific media content items the plurality of users will probably rent is added to the media-on-demand platform by the recommender system in case the expected profit is higher or equal to the preset profit value or the expected loss is lower or equal to the preset loss value.

Preferably, the media content items are digital media content items, such as digital videos, digital photos, digital music, computer programs, especially games, and/or digital texts. According to the invention, the media-on-demand platform is directed to renting all kind of digital media items to end-users, e.g. by streaming from a server. The digital media items can comprise videos, games, music or books. Alternatively the media items can be delivered to the end-users by mail. In addition, the focus of the present invention is also directed to situations where end-users are buying items instead of renting items via an operator.

Furthermore, a system is provided for automatically executing the method for efficiently compiling media content items for a media-on-demand platform according to the invention. The system comprises a recommender unit that is configured to determine user-specific like-ratings for media content items, a number-of-rentals predictor that is configured to determine the amount of media content items a user is expected to rent from the rated group of media content items, and a financial evaluator unit that is configured to generate a merged group of quantified media content items and to determine the expected profit or loss for providing specific media content items. Each of the subsystems can comprise a data processing unit. In addition the system can comprise databases for storing and managing user related data and/or media content related data. The database can e.g. comprise meta data of media content items that has been generated by a third party.

In an embodiment of the invention an operator of a video-on-demand platform determines a video set to be potentially added to the video-on-demand platform. The information about the video set, such as e.g. titles, genres, actors, time of publication, nominations and/or granted awards, is passed to a rental income predictor. Furthermore, information about actual and/or potential end-users of a group of end-users of the video-on-demand platform, such as e.g. age, gender and/or interests, is provided to the rental income predictor as well. The information about the end-users can be stored in an end-user database and provided to the rental income predictor from the end-user database directly.

A recommender system is provided with the information about the video set and user like-ratings of the individual end-users for the videos of the video set. Furthermore the recommender system can be provided with information about rental history of the individual end-users. The like-ratings can be provided by the individual end-users explicitly or implicitly by analyzing the rental history of the end-users. From this information the recommender system generates like-ratings for each video of the video set and consequently a ranking of the videos of video set for each individual end-user. In other words, the recommender system determines for each of the subscribers (end-users) a list of the videos from the given video set that he or she will like most, possibly quantified with a corresponding like-rating. This like-rating can e.g. be a value between zero and one, wherein number "one" means that the user is estimated to strongly like the given video and a "zero" means that the user strongly dislikes the video. Such a recommender system can be content-based or it can be based on collaborative filtering, or a combination of both.

The information about the like-ratings for each video, rankings of the videos of the video set and rental history of the individual end-users is provided to a number-of-rentals predictor. Furthermore the number-of-rentals predictor is provided with information about the like-ratings of the videos which are considered in the rental history of the end-users. The number-of-rentals predictor determines for each of the end-users an estimate of the number of videos that he or she will rent the following period of service. This estimate can simply be based on the rental history, i.e., on information about how many videos the user has rented during the past periods of service, or for new users on the average number of rentals (averaged over all users or averaged over all new users, based on information from past periods of service), not taking into account which video set is offered the coming period of service.

Alternatively, the number-of-rentals predictor can use the rankings of the videos from the given video set for the individual end-user, as specified by the recommender system to estimate the number of rentals, or if required an estimate of the exact set of videos that the individual end-user is expected to rent.

In addition to using it to predict the number of rentals, the rental history can also be used to see which videos the end-user has already rented in the past periods of service. Videos that have recently been rented are not likely to be rented again in the near future.

An estimate of which videos a given user is likely to rent in the coming period of service can now be simply determined as follows. A list comprising the rankings of videos for an individual end-user is retrieved from the recommender system and videos that were recently rented are removed from this list. Then, assuming that the estimated number of rentals for the coming period of service is k, the estimate of the set of videos that the given user will rent the coming period of service is simply given by the first k elements from the resulting adapted list.

In a more advanced embodiment the predicted number of rented videos can be influenced by the estimated like-rating specified by the recommender system. In this embodiment the recommender system determines a first list comprising the rankings and the like-ratings of videos the individual end-user has rented within a determined period of service in the past. Like-ratings of the videos offered in the same period of service which have not been rented can be considered in the first list as well.

Furthermore, a second list of the estimated rankings and like-ratings of videos from the prospective set of videos to be offered to the end-users in the following period of service is provided. The like-ratings of the different rankings of the first and the second list are compared with each other. In case the like-ratings of videos of the second list are higher or equal to videos of the first list that have been rented by the end-user in the past, the video is likely to be rented by the end-user with a higher probability then if the like-rating is the same or lower than the like-rating of a video the end-user has not rented in the past. This information is evaluated statistically for generating an estimation of the number of videos the user will rent of the prospective set of videos.

If the system uses a differential pay-per-view payment model, then additionally the rental history of a user can be analyzed to see whether the user predominantly hires only more expensive, recently released videos, or whether the user predominantly hires less expensive videos. This can be used to have a more accurate prediction of the amount of money that the user is expected to spend on video rental in the coming period of service. Besides the number of videos the end-user is probably going to rent from the video set offered within the following period of service the number-of-rentals predictor can also estimate which videos the end-user is probably going to rent. This estimation is based on the thesis that the end-user will rent the videos according to the ranking with respect to the like-rating. The end-user will probably rent the videos with the highest like-ratings. If the number of estimated videos the end-user is going to rent was "k", the end-user is likely to rent the first k videos of his individual ranking.

An important feature of the invention is a rental income predictor that estimates the income a given media set will generate when offered to the group of end-users during the following period of service. The rental income predictor makes use of the recommender system and the number-of-rentals predictor. Therefore, the recommender system and number-of-rentals predictor can be considered sub-systems of the rental income predictor. Given that the recommender system gives for each combination of end-user and video set a ranking of videos and given that the number-of-rentals predictor gives for each combination of end-user and video set an estimate of the number of movies that the given user is likely to rent in the following period of service, it is easy to calculate the expected amount of money that the given user will spend on rentals the following period of service. Possibly, the rental history of this user is being taken into account.

Now, the overall rental income can simply be obtained by summing over all users the expected amount of money that each user will spend on rentals the coming period. Obviously, alternatively more advanced probabilistic models can also be used to predict the total rental income. A more advanced embodiment of the rental income predictor also includes taking into account the popularity of individual videos. For example, videos that have been released recently as feature movies and attracted many viewers in the cinemas and/or have been well received in reviews are likely to attract more interest from the end-users. A possible way to include these popularity indicators is to additionally increase the like-rating of these popular items, in comparison to the estimated like-degree given by the recommender system.

It should be noted that determining the popularity of a new video is not the same as determining a user-specific like-rating, and that how often a particular video will be rented is not the same as estimating a user-specific number of media content items the user would rent.

Additionally, if the resulting like-degree for these popular items is sufficiently large for a given end-user, then the estimate for how many rentals the end-user is likely to have in the coming period of service is correspondingly increased by a suitable fraction. The exact value of this fraction can be determined experimentally. Accordingly, the like-ratings of videos that e.g. received negative ratings by media critics can be influenced negatively. This can also have a negative effect on the amount of videos the end-user is estimated to rent and shall be considered respectively.

The rental income predictor could be used as a simple tool, where repeatedly the operator can specify the video set and subscriber set as input to get as output the expected income from video rentals for these specified inputs. Alternatively, the rental income predictor can be part of a large system, where the larger system automatically tries to optimize the net income by also taking into account the rental costs that the operator has to pay for the given video set. In that case, the different combinations of video sets can be generated, and for each of these combinations the estimated net income can be computed. This larger system could simply return the top-n combinations that are expected to generate the largest net rental income. All combinations could be considered exhaustively, but this can be impractical.

Alternatively, a local search approach could be applied to repeatedly try to find a better solution, by trying to add or leave out a video set to the current combination whenever this improves the overall result. Then in the end, the operator can choose one of these combinations, taking into account possibly other aspects, such as strategic considerations on whether the operator wants to invest in growing its subscriber base.

Finally, the above system can also be used to estimate the satisfaction of the subscribers. From the estimated like-rating of the videos that are estimated to be rented by a given end-user an estimate of how satisfied the end-user can be derived. In addition, if the estimated number of rentals for a user increases or decreases in comparison to the (average) number of rental during past periods of service, then this can be interpreted as an indication that the satisfaction of this users increases or decreases, respectively.

A preferred embodiment of the invention relates to a system and/or a method for efficiently compiling a data set, in particular a set or group of multiple media content items and/or data, in particular information about the media content items. The media content items for example are digital and/or non digital items e. g. DVDs, CDs, books, movie files, music files and/or e-book files and so on. The data is stored in a database, e. g. a sever or computer. The data is part of a media-on-demand platform for offering the media content items for rent to a user, e. g. via a website, telephone or suitable TV channel. Furthermore the data comprises information data about a rental history of each user and/or the individual user ratings for media content items. The rental history of the user contains further information data about the specific media content items such as for example title, genre, actors, rental price, date of release or the like. The information is stored as meta data in a user database, which is preferred part of the database. The system and method is configured to provide an additional set or group of regarded data, wherein the additional data set comprises at least one media content item, and the regarded media content items are considered for being offered, namely presented to a particular user by the media-on-demand platform. For providing, in particular generating the additional data set the meta data of the media content items stored in a database are provided, means transferred to a recommender system, wherein the recommender system acquires the meta data or information about the likes, dislikes and/or consumer behaviour of the user stored as meta data in the user database, wherein a high like-rating of an item means that the user likes the particular media content item more than a media content item with a lower like-rating. As a result and based on the acquisition of the metadata of the media content items the recommender system generates the additional data set, in particular a rated group of rated media content items by determining a user specific like-rating for each regarded media content item, wherein the determined like-rating is generated with regard to an assessment and/or an estimation based upon a rental history of the particular user and/or another representative user of the media-on-demand platform. Furthermore the system and method is configured to estimate or predict a user specific number of media content items the particular user of the media-on-demand platform would rent from the rated group of rated media content items within a defined period of time by a number-of-rentals predictor, considering information about the rental history of the particular user and/or other representative users of the media-on-demand platform and the respective like-rating of the rated media content items. Following this, the estimated, means predicted user specific number is presented to an operator of the media-on-demand platform to adjust the storage for the multiple of media content items in the media-on-demand platform. The aforementioned system and method provides an improved system for providing a more efficient utilization of digital (e. g. memory storage) and/or non digital storage (e. g. shelfs) space because the operator is—using the above mentioned system and method—capable to estimate how much storage space is necessary for the defined period of time in the future. For example, instead of simply offering mainly block busters and generally popular videos, the storage space is optimized to provide a more balanced set of videos for rent.

BRIEF DESCRIPTION OF THE DRAWINGS

In the following the invention will be described in an example referring to a drawing. In the drawings.

DETAILED DESCRIPTION

Figure 1:
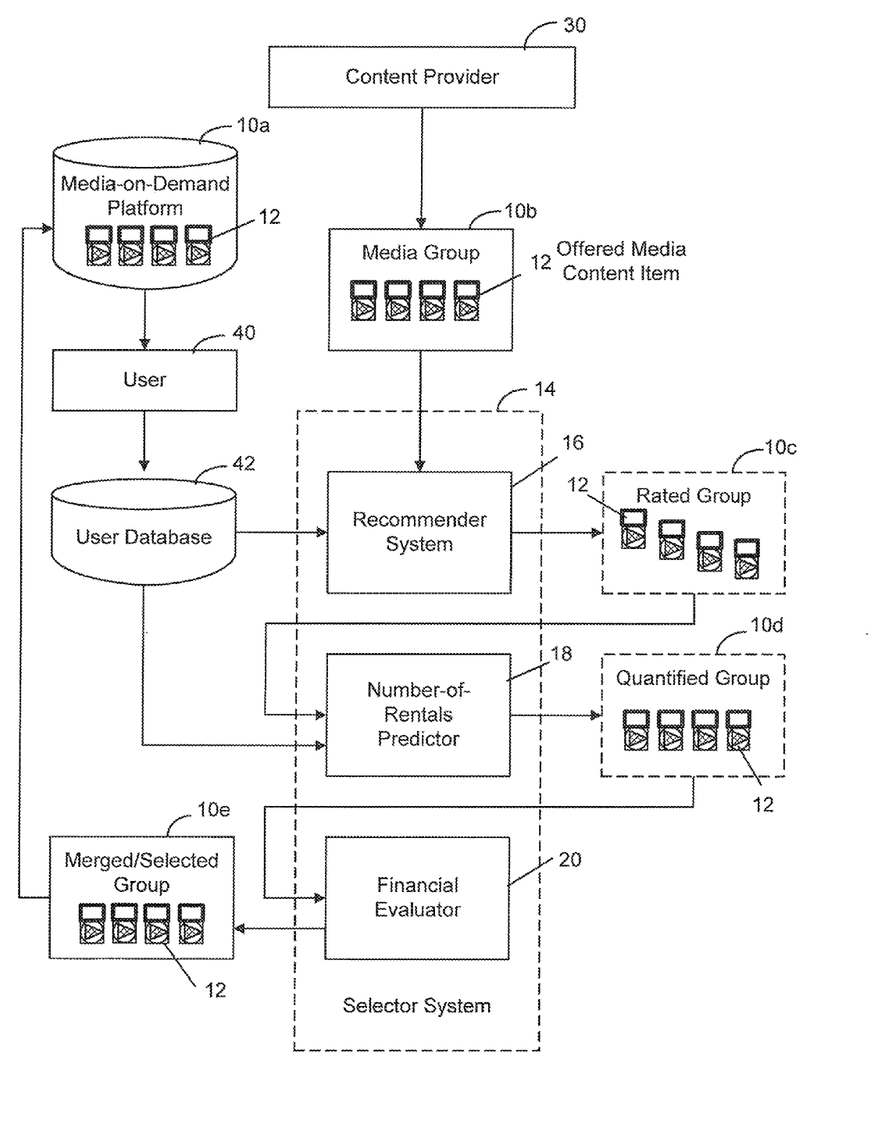
FIG. 1 describes a selector system for efficiently compiling media content items for a media-on-demand platform.

Referring to FIG. 1, a media-on-demand-platform 10a is provided comprising a plurality of offered media content items 12 to a user 40. The media content items 12 can comprise digital and/or non digital media content items. The user 40 can rent offered media content items 12 according to a rental model as discussed above, e.g. pay per view or monthly subscription with limited or unlimited amount of media content items 12 for rental. The rental history of the user 40 and individual user ratings for media content items 12 are stored in a user database 42. The rental history of the user 40 can comprise information about the specific media content items 12 such as title, genre, actors, rental price, date of release or the like. Furthermore, the amount of each media content item 12 rented by a user 40 and personal user specific data can be stored in the user database 42.

A content provider 30 offers a media group 10b of regarded media content items 12 to an operator of the media-on-demand platform 10a. Alternatively a plurality of content providers 30 can be considered. The regarded media content items 12 are further provided to a selector system 14 for efficiently compiling media content items 12 for the media-on-demand-platform 10a. The selector system 14 comprises a recommender system 16, a number-of-rentals predictor 18 and a financial evaluator unit 20. Each of these components comprises a not illustrated data processor unit.

The meta data of the regarded media content items 12 is provided to the recommender system 16. The recommender system 16 acquires information about the likes, dislikes and consumer behaviour of the user 40 from the user database 42. In addition, a plurality of other sources can be considered for determining the likes and dislikes of the user 40, e.g. sales figures, marketing studies or the like. Subsequently, the recommender system 16 evaluates the gathered information for determining a like-rating for each regarded media content item 12. In this regard a high like-rating of an item means that the user 40 likes the particular media content item 12 more than a media content item 12 with a lower like-rating. The spectrum can e.g. range from liking an item very much to disliking an item very much. As a result a rated group 10c of user rated media content items 12 is generated for each individual user 40 separately. Alternatively, only a specified group of user 40 can be considered in this regard.

The like-rating can also be manipulated by the operator e.g. in case the needs of a certain target group of potential new user have to be pleased with the media-on-demand platform 10a. Additionally, the recommender system 16 can sort the rated media content items 12 of the rated group 10c by the value of the like-ratings. The like-rating rated of media content items 12 that have been rented by the user 40 already can be automatically reduced by the recommender system 16 because of the unlikeliness that a user 40 will rent the same media content item 12 again. The time span between the last rental and the present time can be considered as well, wherein the reduction of the like-rating will be less the longer the respective time span is. Alternatively to reduction of like-rating, the respective rated media content item 12 can be removed from the rated group 10c by the recommender system 16. Furthermore, rated media content items 12 that have a like-rating below a specified threshold, e.g. items the user 40 dislikes, can be removed from the rated group 10c by the recommender system 16 as well. The number-of-rentals predictor 18 compares information from the user database 42 with the rated media content items 12 of the rated group 10c for determining the amount of media content items the user 40 will probably rent from the rated group 10c of rated media content items 12 within a specified period of time, e.g. a week or month. Thereby, especially the rental history of the user 40 is considered. In case a user 40 has rented a certain number of media content items 12 within a specified period of time in the past, it is likely that the same user 40 will rent about the same amount of media content items 12 in a period of the same length in the future when the like-rating of the newly provided media content items 12 is about the same as the like-rating of the already rented media content items 12.

In case the like-ratings of the newly provided media content items 12 are higher than the like-ratings of the already rented media content items 12, the expected amount of rentals can be higher as well. Respectively, if the like-ratings of the newly provided media content items 12 are lower than the like-ratings of the already rented media content items, the expected amount of rentals can be less. For this consideration the average value of like-ratings and/or the like-ratings of the least liked media content items 12 the user 40 has rented can be regarded. As a result, the number-of-rentals predictor 18 provides a quantified group 10d of quantified media content items 12 for each individual user 40 separately. Alternatively, for generating the quantified group 10d of quantified media content items the number-of-rentals predictor 18 can consider a specified group of representative users 40 only.

In a succeeding step the financial evaluator unit 20 merges all quantified groups 10d for each considered user 40 to a merged group 10e of merged media content items 12. The financial evaluator unit 20 compares the costs for rental from the content provider 30 for each merged media content item 12 of the merged group 10e with the expected income from renting the merged media content item 12 to the users 40. Merged media content items 12 that produce higher costs than income are automatically removed from the merged group 10e by the financial evaluator unit 20. Thus, the financial evaluator unit 20 generates a selected group 10e of selected media content items 12 and provides the selected group 10e to the media-on-demand platform 10a. This can be done either by simply adding the selected media content items 12 to the media-on-demand platform 10a or by replacing the offered media on demand items 12 of the media-on-demand platform 10a with the selected media content items 12.

Alternatively the selected group of selected media content items can be offered to an operator for human inspection. Different groups of selections can then be evaluated by the operator.

In the following, details of an implementation of a financial evaluation unit according to the invention are described.

Modeling the Revenue for a Given Selection of Video Sets

In this example, the media content items are videos. However, instead of videos other kind of media content items could be treated alike. We consider N content providers numbered 1, 2, ... N, each offering sets of videos that a video-on-demand (VoD) provider may selectively rent for a period of time. For a given selection $S_{\{11\}}$, $S_{\{12\}}$, ..., $S_{\{1,n(1)\}}$, $S_{\{21\}}$, $S_{\{22\}}$, ..., $S_{\{2,n(2)\}}$, $S_{\{N,1\}}$, $S_{\{N,2\}}$, ..., $S_{\{N,n(N)\}}$, we next express the income that the VoD provider, having a subscriber base denoted by U, expects to generate. Let O denote the total video offer, i.e., $$O = \bigcup_{i=1}^{N} \bigcup_{j=1}^{n(i)} S_{\{ij\}}.$$

For each user $u \in U$ and video $v \in O$, the recommender will provide a like degree $l(u,v) \in [0,1]$, indicating to what extend user u likes video v. Based on the offer, a probability $P(O,u,v)$ that user u will rent video v in the coming period can be estimated as follows. Suppose that the user rents a number $n(u,O)$ of videos in a period, which may depend on the (size of) offer O. This can easily be estimated using the u's rental history. Then, for example, a random sample of size $n(u,O)$ is selected from a subset of size M of the videos in O with the highest like degrees. Alternatively, suppose that the user rents a number $n(u,O,g)$ of videos in a period of a specific genre g. This can also be easily estimated using the user's rental history. Then, for example, a random sample of size $n(u,O,g)$ is selected from a subset of size M of the videos in O with the highest like degrees and having genre g. More generally, if a user is characterized by multiple personal channels (Pronk, V., J. Korst, M. Barbieri & A. Proidl [2009]. Personal television channels: simply zapping through your PVR content, *Proceedings of the 1st International Workshop on Recommendation-based Industrial Applications, in conjunction with the 3rd ACM Conference on Recommender Systems*, RecSys 2009, New York City, N.Y.), then the defining filter for each channel can be used instead of specific genres to subdivide the selection of videos. Also, each channel would be equipped with a separate recommender that provides corresponding like degrees. In case a video would be selected in the context of two or more channels, then only one with the highest like degree is retained and alternatives are selected for the other channels. In addition to each of the mentioned ways of constructing a set of videos, this construction can be refined by replacing selected videos that occur on a 'black-list' of, e.g., recently rented videos by corresponding alternatives.

In any of the examples described above, a set (that is a selected group) of size $n(u,O)$ of videos is selected. These selected videos obtain a high probability $P(O,u,v)$, e.g., a probability of 1, and any other videos in O a low probability $P(O,u,v)$, e.g., a probability of 0.

If the price that u has to pay for renting v is $p(u,v)$ and the subscription fee for this user per rental period is given by $s(u)$, then the total income the VoD provider obtains from u in the rental period given O can be estimated by $$s(u) + \sum_{v \in O} P(O, u, v) \cdot p(u, v).$$

Summing the contributions from all users u in his customer base U and all sets, the total income for the VoD provider for the coming period, including the periodic subscription fee s(u), can be expressed as $$\sum_{u \in U} \left( s(u) + \sum_{v \in O} (P(O, u, v) \cdot p(u, v)) \right).$$

To promote diversity, aiming to retain the customer base, a deregularization factor can be incorporated in the above expression. In particular, the above expression can be multiplied by $R(|O|)$, where R is a monotonically non-decreasing function from the natural numbers to the real interval [0,1] and |O| denotes the cardinality of O. This function operates as a penalty on the income and may be learned by historical analysis of the size of the customer base as a function of the total size of the video offer. As a simple example, the function R only attains the values 0 and 1, meaning that the total offering should have some minimal size.

Conversely, the cost associated to renting and storing the sets $S_{\{i,1\}}, S_{\{i,2\}}, \ldots, S_{\{i,n(i)\}}$ from content provider i can be quantified as $C_i(\{S_{\{i,1\}}, S_{\{i,2\}}, \ldots, S_{\{i,n(i)\}}\})$.

Summing the costs over all content providers then constitutes the total cost.

Summarizing, the revenue of the VoD provider for the next period is given by $$\sum_{u \in U} \left( s(u) + \sum_{v \in O} (P(O, u, v) \cdot p(u, v)) \right) \cdot R(|O|) -$$

$$\sum_{i=1}^{N} C_i(\{S_{\{i,1\}}, S_{\{i,2\}}, \ldots, S_{\{i,n(i)\}}\}).$$

It goes without saying that costs that are independent of the sets of videos need not be incorporated into the equation.

A possibility to refine the calculation of the total revenue is to incorporate a price-dependent selection algorithm. Then, assuming that the total price setting is denoted by p, a number n(p,u,O) of videos is selected and each of the described selection processes becomes slightly more complicated, as, e.g., a maximum amount to spend per period can then be taken into account.

In an automatic optimization procedure the expected revenue from different selections of video sets is calculated in order to determine the video set that promises the highest revenue to vary the selection of video sets a local search over selections of video sets can be automatically performing as follows. Now, the approach in local search is the following. For each selection $S_{\{11\}}, S_{\{12\}}, \ldots, S_{\{1,n(1)\}}, S_{\{21\}}, S_{\{22\}}, \ldots, S_{\{2,n(2)\}}, S_{\{N,1\}}, S_{\{N,2\}}, \ldots, S_{\{N,n(N)\}}$, a neighborhood is defined. This neighborhood defines selections that are very similar, but different from this selection, for example because a single set has been added or removed. Using this or another, appropriately defined, neighborhood function, a local search can started in an arbitrarily chosen initial selection and the revenues are calculated for this selection. This initial selection is said to be the current selection. Then, all, or some, neighbors of the current selection are preselected and their revenues are calculated. If there are, among these selections, selections that result in a larger revenue than generated by the current selection, one of these selections is designated as the current selection, and an improvement has been attained. This process of generating improvements iteratively is repeated, until a local minimum has been reached and no improvement can be made in this way anymore.

This iterative improvement process can be repeated by using alternative initial selections and, in the end, choosing the best local minimum.

It is also possible to repeat the local search by using a selection of different price settings to maximize profit. The price settings to be explored could be set in advance, taking the competition into account.

The particular local search described above only serves as an example. For those skilled in the art, it will be obvious that there are numerous variations on local search, well described in literature, such as tabu search, stochastic local search, genetic local search, simulated annealing, etc., and that for the optimization problem at hand, numerous variations can be considered.

In order to ensure that the VoD provider will always have a selection of the most popular video's available for rent, these could be excluded from the consideration above, e.g., by removing them from the sets of videos. The optimization solution described above will then concentrate on the videos for which individual differences in like degrees are more prominently considered.

The invention claimed is:

1. A method for selecting a data set in a form of a group of digital media content items from a plurality of groups of digital media content items for offer on a media-on-demand platform in order to adjust memory storage for the media content items in the media-on-demand platform comprising the steps of:

providing a media-on-demand platform for offering groups of media content items for rent to users of the media-on-demand platform, wherein the media-on-demand platform allows for the digital media content items to be streamed from a media-on-demand server to the users via a data network, providing to a recommender system meta data of regarded media content items forming a plurality of regarded media groups, each regarded media group of regarded media content items comprising a plurality of regarded media content items, wherein the regarded media groups of regarded media content items are considered for being offered on the media-on-demand platform, the recommender system generating rated groups of rated media content items by determining, for a plurality of different users, a user specific like-rating for each regarded media content item, wherein the user specific like-rating is determined with regard to an assessment or an estimation based upon a rental history of the particular user of the media-on-demand platform, wherein the rental history and the user specific like-rating is stored in a database, wherein the rental history contains information about the media content items in a form of meta data, a number-of-rentals predictor, which is implemented in a data processor unit, estimating, for each of the rated media groups and for each of the plurality of different users, a respective user-specific number of rated media content items the respective user of the media-on-demand platform would rent from the respective rated group of rated media content items within a defined period of time, using information about the rental history of the particular user of the media-on-demand platform and the respective like-rating of the rated media content items, using a sum of the estimated user-specific numbers of rated media content items the respective user of the media-on-demand platform would rent from the respective rated group of rated media content items within the defined period of time, and using a predetermined price setting to evaluate an estimated revenue for each of the rated groups of rated media content items, and selecting from the rated groups of rated media content items that rated group of rated media content items which is associated with a highest among the estimated revenues, for offer on the media-on-demand platform.

2. The method according to claim 1, wherein the providing to the recommender system meta data of regarded media content items comprises the further step of compiling the regarded media groups, and wherein the recommender system removes those media content items from the regarded media groups that have a user specific like-rating below a preset value.

3. The method according to claim 1, comprising the further step of:

identifying and removing the regarded media content items the particular user has already rented from the regarded media group of regarded media content items by they recommender system.

4. The method according to claim 1, wherein the considered information about the rental history of the particular user comprises information about genre, persons involved in making the media content item, date of media release and/or a rental price of the media content item.

5. The method according to claim 1, comprising the further step of:

generating a user specific ranking of the rated media content items by the recommender system according to the respective user specific like-rating of the rated media content items.

6. The method according to claim 5, comprising the further step of:

removing rated content items with the worst user specific like-rating from the group of rated media content items by the recommender system.

7. The method according to claim 1, comprising the further step of:

generating a quantified group of quantified media content items by determining the specific rated media content items the particular user will prospectively rent from the rated group of rated media content items by the number-of-rentals predictor, based on the determined user specific number of media content items the user will rent of the rated group and the particular user specific like-ratings of the rated media content items.

8. The method according to claim 7, comprising the further step of:

determining the costs for renting each quantified media content item of the quantified group from a respective content provider by a financial evaluator unit.

9. The method according to claim 8, comprising the further step of:

determining the turnover for renting the determined specific media content items to the particular user by the financial evaluator unit.

10. The method according to claim 9, comprising the further step of:

calculating the difference between the determined costs and determined turnover and determining the expected profit or loss by the financial evaluator unit.

11. The method according to claim 10, wherein the media content items of the quantified group of each regarded user are merged to a merged group of media content items by the financial evaluator unit and the expected profit or expected loss is compared with a preset profit value or loss value by the financial evaluator unit.

12. The method according to claim 11, comprising the step of:

adding the merged specific media content items the plurality of users will probably rent to the media-on-demand platform by the recommender system in case the expected profit is higher or equal to the preset profit value or the expected loss is lower or equal to the preset loss value.

13. The method according to claim 1, wherein the media content items of the quantified group of each regarded user are merged to a merged group of media content items by a financial evaluator unit.

14. The method according to claim 1, wherein the media content items are digital media content items.

15. The method according to claim 14, wherein the digital media content items are digital videos, digital photos, digital music, computer programs or digital texts.

16. A system for automatically executing the method for efficiently selecting media content items for offer on a media-on-demand platform according to claim 1, comprising:

a recommender unit for determining user-specific like-ratings for media content items;

a number-of-rentals predictor for determining the amount of media content items a user is expected to rent from the rated group of media content items; and a financial evaluator unit for generating a merged group of quantified media content items and for determining the expected profit or loss for providing specific media content items.

17. A method for efficiently compiling a data set in a form of a group of digital media content items from a plurality of groups of digital media content items for offer on a media-on-demand platform in order to adjust memory storage for the multiple of media content items in the media-on-demand platform comprising the steps of:

providing a media-on-demand platform for offering groups of media content items for rent to users of the media-on-demand platform, wherein the media-on-demand platform allows for the digital media content items to be streamed from a media-on-demand server to the users via a data network, providing to a recommender system meta data of a regarded media group of regarded media content items forming a plurality of regarded media groups, each regarded media group of regarded media content items comprising a plurality of regarded media content items, wherein the regarded media groups of regarded media content items are considered for being offered on the media-on-demand platform, the recommender system generating rated groups of rated media content items by determining, for a plurality of different users, a user specific like-rating for each regarded media content item, wherein the user specific like-rating is determined with regard to an estimation based upon a rental history of the particular user and another representative of the media-on-demand platform, wherein the rental history and the user specific like-rating is stored in a database, wherein the rental history contains information about the media content items in a form of meta data, and a number-of-rentals predictor, which is implemented in a data processor unit, estimating, for each of the rated media groups and for each of the plurality of different users, a respective user specific number of rated media content items the respective user of the media-on-demand platform would rent from the respective rated group of rated media content items within a defined period of time, using information about the rental history of the particular user and other representative users of the media-on-demand platform and the respective like-rating of the rated media content items, using a sum of the estimated user-specific numbers of rated media content items the respective user of the media-on-demand platform would rent from the respective rated group of rated media content items within the defined period of time, and using a predetermined price setting to evaluate an estimated revenue for each of the rated groups of rated media content items, and compiling from the rated media content items that rated group of rated media content items which is associated with a highest among the estimated revenues, for offer on the media-on-demand platform.

* * * * *